Figure 3:
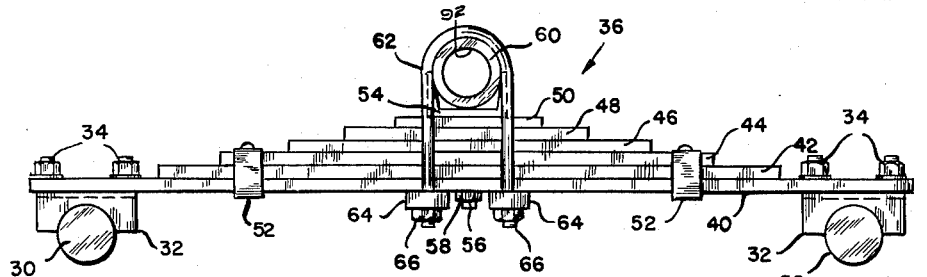

Aug. 3, 1965  J. E. MOLL  3,198,365
PIVOTABLE PLATFORM TRAILER
Filed Feb. 14, 1964  2 Sheets-Sheet 1
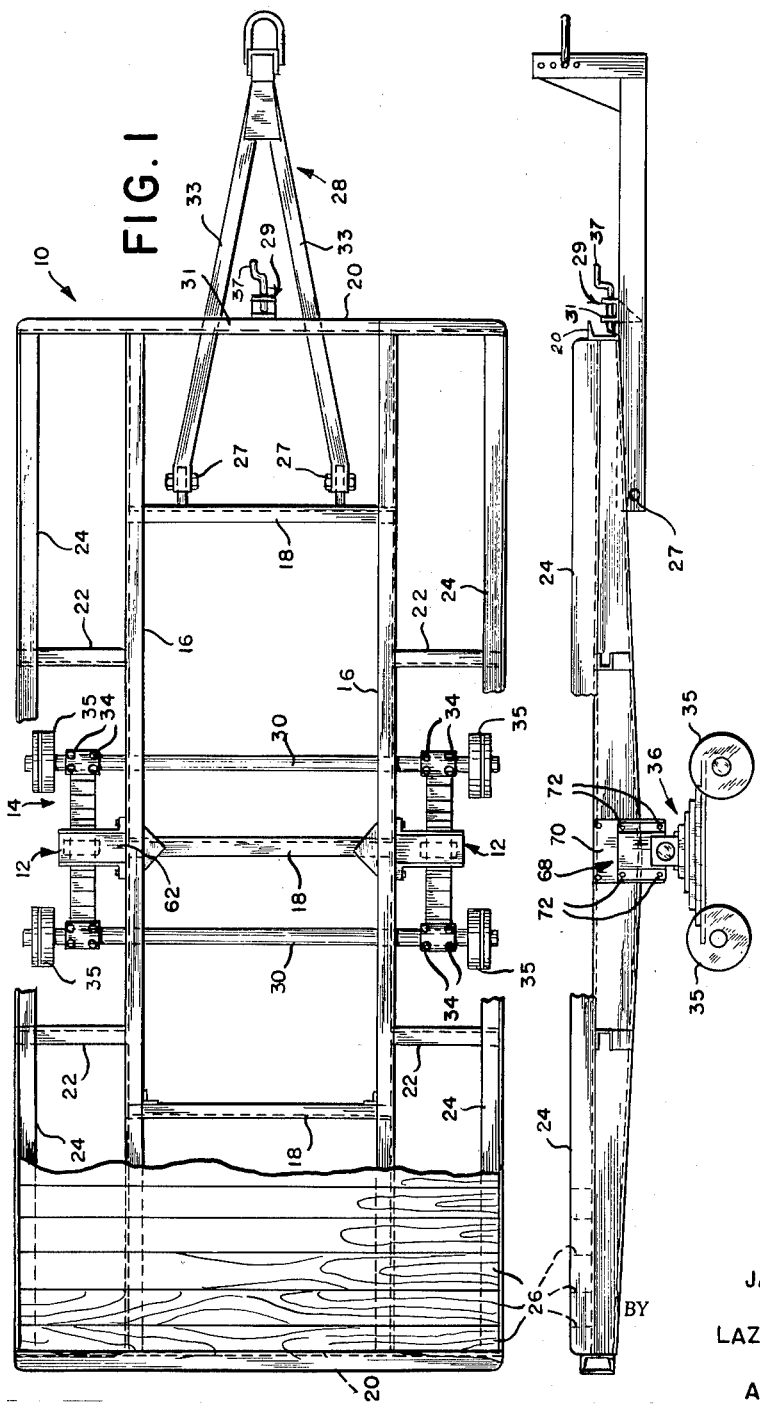
INVENTOR.
JACK E. MOLL
BY LAZO & BARRY
Attorneys Aug. 3, 1965  J. E. MOLL  3,198,365
PIVOTABLE PLATFORM TRAILER
Filed Feb. 14, 1964  2 Sheets-Sheet 2

INVENTOR.
JACK E. MOLL
BY
LAZO & BARRY
Attorneys 3,198,365
PIVOTABLE PLATFORM TRAILER
Jack Ervin Moll, New Berlin, Wis., assignor to Miller Tilt-Top Trailer, Inc., Milwaukee, Wis., a corporation of Wisconsin
Filed Feb. 14, 1964, Ser. No. 345,037
5 Claims. (Cl. 214—505)

This invention relates to trailers which are used primarily for hauling construction equipment and more particularly to an improved mounting arrangement for such trailers.

Trailers of the type contemplated herein have been used quite successfully for loading and unloading various types of construction equipment such as caterpillars, front end loaders, rollers, pavers, tractors, etc. The platforms are balanced on suspension systems so that they can be tipped or tilted into engagement with the ground by merely pushing down on the end of the platform. A particular piece of construction equipment can then be driven onto the platform and as the center of gravity of the equipment passes over the pivot axis of the platform, the platform will tilt back to its horizontal position. The platforms have been mounted on walking beams which have the pivot axis for the platform located between the wheels at each end of the beam. These beams are independently connected to the platform and are particularly adaptable for use on rough terrain. Each walking beam is free to pivot with respect to the platform so that the vertical motion of the wheels is reduced substantially before it is imparted to the platform. With the present walking beam type of carriage, vertical shocks are not completely absorbed and as a consequence are imparted to the equipment on the platform.

One of the primary objects of this invention is to provide an undercarriage for a tilting platform type trailer which reduces the amount of vertical shock normally imparted to the platform.

Another object of this invention is to provide an undercarriage for a tilting platform type trailer which improves the roadability of the trailer.

Another object of this invention is to provide a spring means type undercarriage for a tilting platform type trailer which absorbs the deflection normally encountered by the trailer on a rough terrain.

A further object of the present invention is to provide an improved trailer at substantially no increase in cost over trailers presently available.

These objects are accomplished by connecting two pairs of wheels (each pair being mounted on an axle) in tandem with the connection between the axles of the wheels being made by leaf type springs located at each end of the axle. A pivot tube is secured to the center of each of the leaf springs and supports a platform bracket by means of a pin so that the platform bracket can pivot with respect to the spring. The cross connection of the wheels through the axles provides a resistance to horizontal forces which tend to twist the beam on the pivot axis. The vertical deflection of the platform normally produced through the rigid connection of the platform with walking beams is now compensated for by the leaf springs which are used to interconnect the axles.

Other objects and advantages will become more readily apparent from the accompanying drawings when read in connection with the following detailed description.

Figure 4:
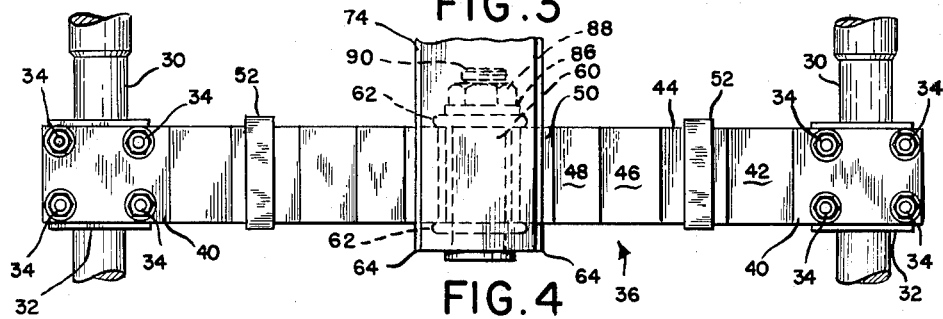
Figures 5, 6:
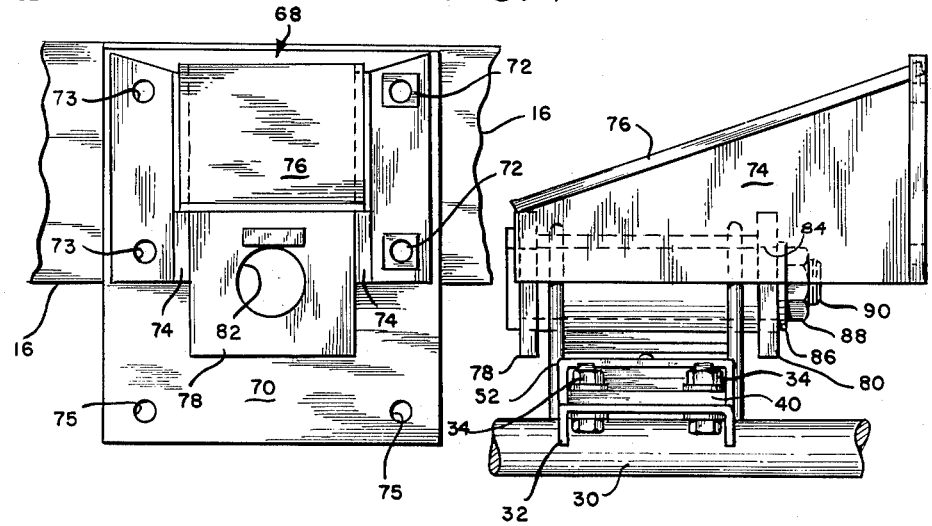

FIG. 1 is a top view of the improved tilting type trailer.
FIG. 2 is a side view of FIG. 1.
FIG. 3 is a side view of the improved undercarriage showing the spring arrangement for one of the tandem mounted wheels.
FIG. 4 is a top view of FIG. 3.
FIG. 5 is an end view of the platform bracket, and
FIG. 6 is an end view of FIG. 3 with the platform bracket mounted thereon.

Referring more particularly to the drawings, the tilting platform trailer includes a platform 10 pivotally connected at 12 to a tandem wheel assembly 14. The platform includes a pair of longitudinal beams 16 which are interconnected by transverse beams 18. End beams 20 extend transversely outward from the longitudinal beams at the front and rear of the longitudinal beams and in cooperation with beams 22 support L-shaped members 24 located on each side of the platform. Wooden planks 26 are normally secured to the L-shaped members to form the top of the platform. A trailer tongue and hitch assembly 28 is pivotally connected by pins 27 to beam 18 and a screw type lock assembly 29 is secured to a cross member on tongue members 33. The lock assembly includes a screw 31 positioned in housing 37 which can be turned into and out of engagement with the lower lip on beam 20. To tilt the platform, lock assembly 29 is released from beam 20 and the back end of the platform is pushed down. Since the platform is balanced at the pivot point, very little weight is required to tilt the platform.

The tandem wheel assembly comprises a pair of axles 30 having wheel hub and brake assemblies 35 rotatably mounted on each end. Tires and rims are mounted on the hubs but are not shown in the drawing. The axles are interconnected by leaf spring assemblies 36 secured to the axles by spring seats 32 which are welded to the axle and are connected to the ends of flat spring member 40 by bolts 34. Each spring assembly has a number of progressively smaller flat plate members 42, 44, 46 and 48 stacked on spring member 40 and held together by a bolt 56 and nut 58.

A pivot tube 60 is welded into channel member 54 which is secured to seat plate 50 by any appropriate means. The seat plate is provided with a central aperture which overlies the head of bolt 56 when it is mounted on the spring assembly to prevent any lateral movement from occurring between the seat plate and the spring assembly. A U-shaped bolt 62 is wrapped around each end of the pivot tube and extends down the sides of the spring assembly. U bolt clips 64 are mounted on the ends of the U bolts and underly the spring member 40. Nuts 66 are screwed onto the U bolts to clamp the pivot pin in place.

Platform brackets 68 are secured to mounting plates 70 on longitudinal beams 16 by passing bolts 72 through holes 73 in the platform bracket and holes 75 in the mounting plate. It should be apparent that the height of the platform with respect to the wheels can be varied by securing the bracket to the upper or lower set of holes in the mounting plate. The platform bracket includes a pair of side walls 74 and a sloping wall 76. Pivot plates 78 and 80 are secured to the inside surface of the side walls for mounting the platform bracket on the spring assembly. The platform bracket is mounted on the spring assembly by inserting pivot pin 90 through aperture 82 in plate 78, aperture 92 in tube 60 and aperture 84 in plate 80. The pin is threaded at its inner end and a washer 86 and nut 88 are mounted on the threaded end. A cotter pin arrangement may be used to hold nut 88 in position.

With this arrangement, the platform is balanced at the pivot point 12 and can be tilted by merely upsetting this balance. If the hitch is connected to a truck, the hitch assembly will pivot on pins 27 as the platform is tilted back and will remain in a horizontal disposition as the platform is tilted. The platform is then loaded by merely driving the particular piece of construction equipment onto the platform until the center of gravity of the construction equipment passes the pivot point of the platform. The platform will then slowly tilt to its horizontal position with end beam 20 resting on members 33. Hydraulic dash pots are generally provided in the front of the platform to slow the tilting motion so that the impact of beam 20 on members 33 will not damage either of these parts.

With the wheels of one side of the platform cross-coupled with the wheels on the other side of the platform by axles 30 and the axles interconnected by spring assembly 36, the tandem wheel assembly will absorb most rough terrain shocks without transmitting such shocks to the platform. It should be apparent that the spring will normally absorb the hard shocks encountered when a trailer is moving at a fast rate of speed over a highway so that none of the equipment on the particular piece of equipment on the platform will be subjected to unnecessary shock.

Although only one embodiment of the present invention has been shown and described, it should be obvious that various changes and modifications can be made herein without departing from the scope of the appended claims.

What is claimed is:

1. A trailer having a pivotable type platform comprising the combination of
    a frame including a pair of wheels on each side of said frame,
    axle means interconnecting said wheels,
    spring means interconnecting said axle means along the sides of said frame, said spring means including a number of flat spring plates of progressively smaller lengths positioned in stacked relation and a pivot means mounted on said spring means, said pivot means including a channel member having upstanding sides and a pin support member positioned in said channel member and held therein by a pair of U bolts, one of which is located on each end of the pivot pin and depends down the sides of the stack of spring plates and
    a platform having mounting brackets extending outward at the sides of the platform at approximately its center of balance and a pin connecting each of said brackets to said pivot means whereby an upset of the balanced relation of the platform will cause the platform to pivot on said pivot means.

2. A tilt top type trailer comprising
    a rectangular platform having mounting plates located on each side substantially at its midpoint and a suspension system including two sets of wheels mounted on independent axles,
    spring means interconnecting said axles in a parallel spaced relation,
    pivot means mounted on said spring means. and
    bracket means piovtally mounted on said pivot means and connected to said mounting plates, said bracket means including a housing having parallel side walls and a top wall sloping downward from said mounting plate and a pair of pivot plates secured to the inside surface of the side walls in a parallel spaced relation for mounting on said pivot means and pin means for securing said parallel plates to said pivot means so that said brackets can rotate on said pivot means.

3. A tilt top type trailer according to claim 2 wherein said pivot means includes a channel member secured to said spring means and a tubular member mounted within said channel member for insertion between said parallel plates.

4. A tilt top type trailer according to claim 2 wherein said mounting plates include means for attaching the bracket means at different positions to vary the height of the platform above said suspension means.

5. A trailer comprising the combination of
    a platform having hitch assembly means pivotally connected to the platform at a point spaced from one end of the platform and a pair of mounting brackets located on the sides of said platform substantially at its midpoint, and
    an undercarriage having a pair of parallel axles and a wheel mounted on the ends of each of said axles, spring means interconnecting said axles and a tubular member mounted on each of said spring means, said mounting brackets having parallel side walls and a downwardly sloping top wall supporting a pair of parallel pivot plates within the confines of said side walls which are spaced to abut the ends of said tubular member and pin means for pivotally mounting said plates on said tubular member, whereby said platform can be tilted with respect to said undercarriage.

References Cited by the Examiner

UNITED STATES PATENTS

| 2,341,939 | 2/44 | Miller | 214—506 |
| 2,411,183 | 11/46 | Baldwin | 214—506 |
| 2,595,474 | 5/52 | Marvin | 280—490 |
| 2,744,643 | 5/56 | Hipp | 214—506 |
| 2,923,425 | 2/60 | Galletta et al. | 214—506 |

GERALD M. FORLENZA, *Primary Examiner.*